Sept. 20, 1932.  R. E. BLETCHER ET AL  1,878,097
COMBINED MIXING AND DIVERTING VALVE
Filed Dec. 13, 1927  3 Sheets-Sheet 1
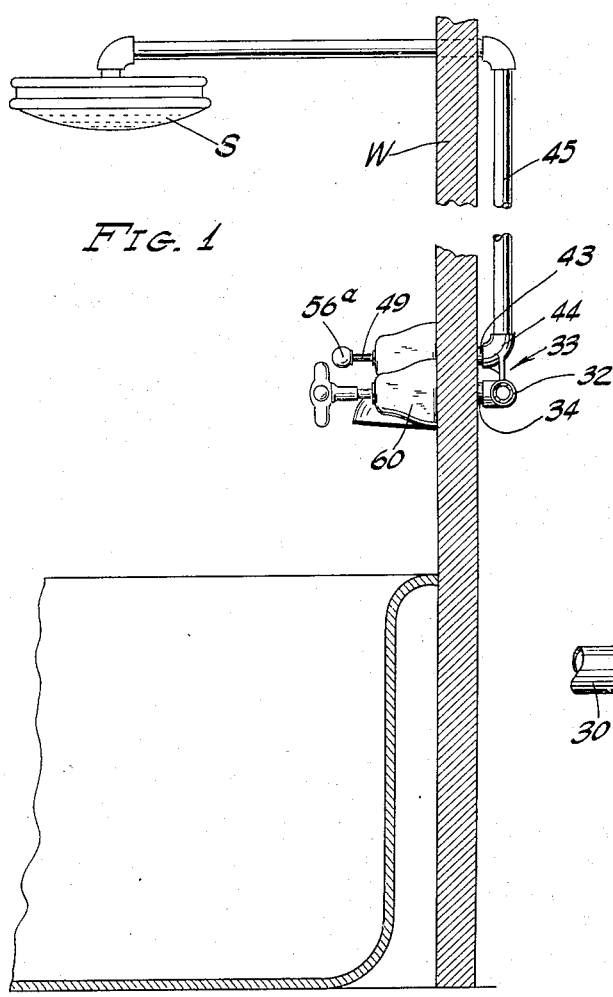
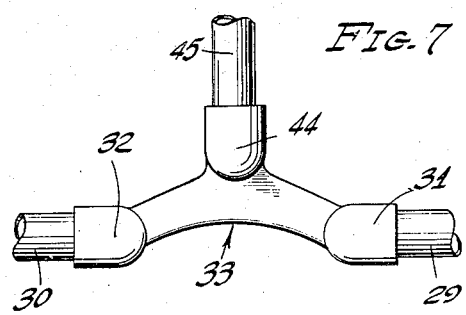
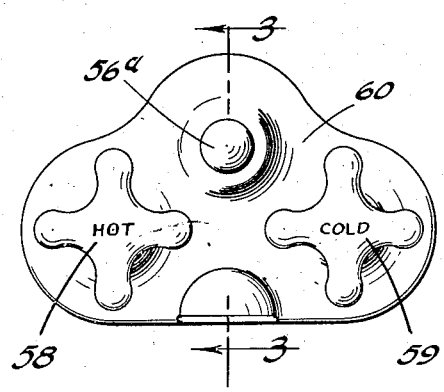
INVENTORS
RALPH E. BLETCHER
ERNEST H. BUCKNELL
BY Munn & Co.
ATTORNEY

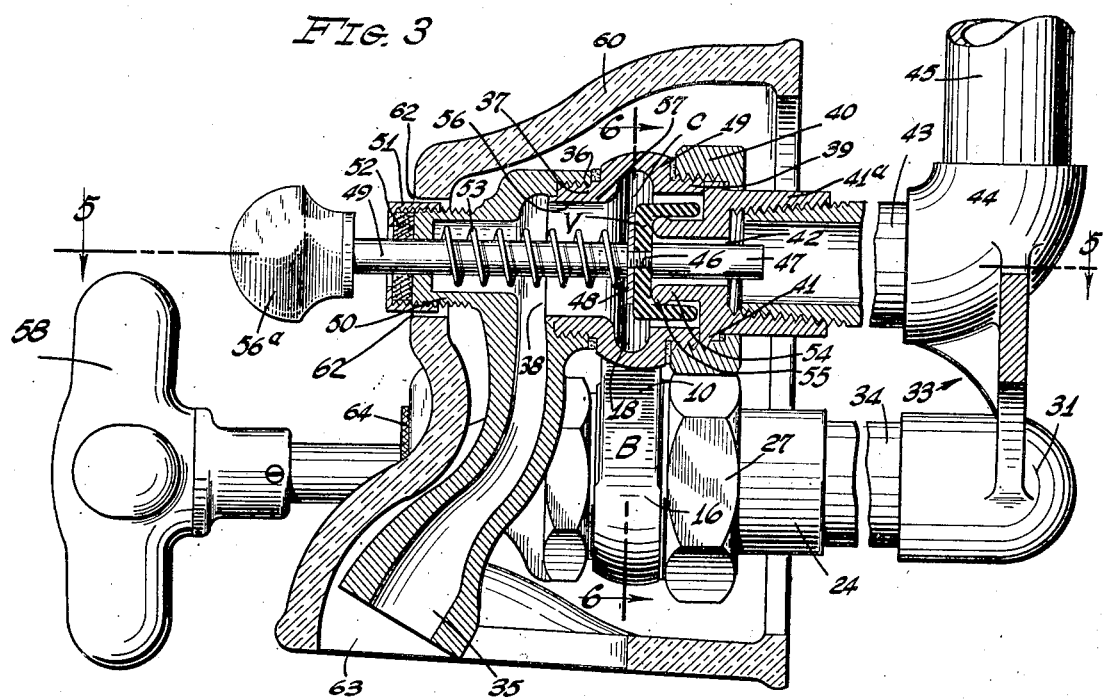
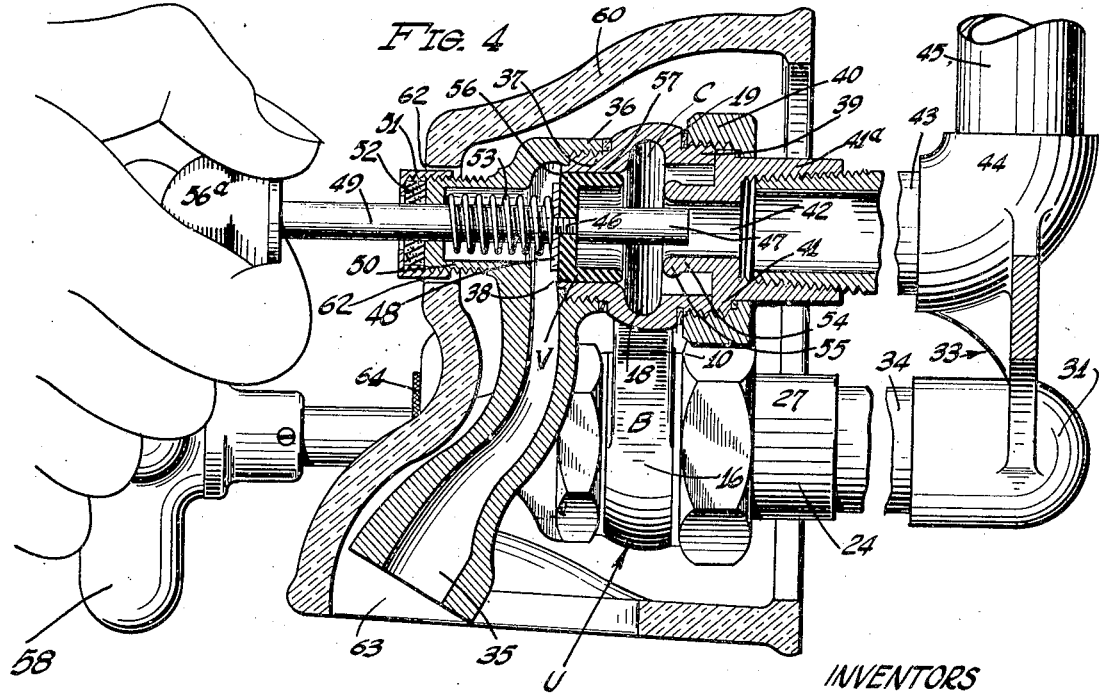

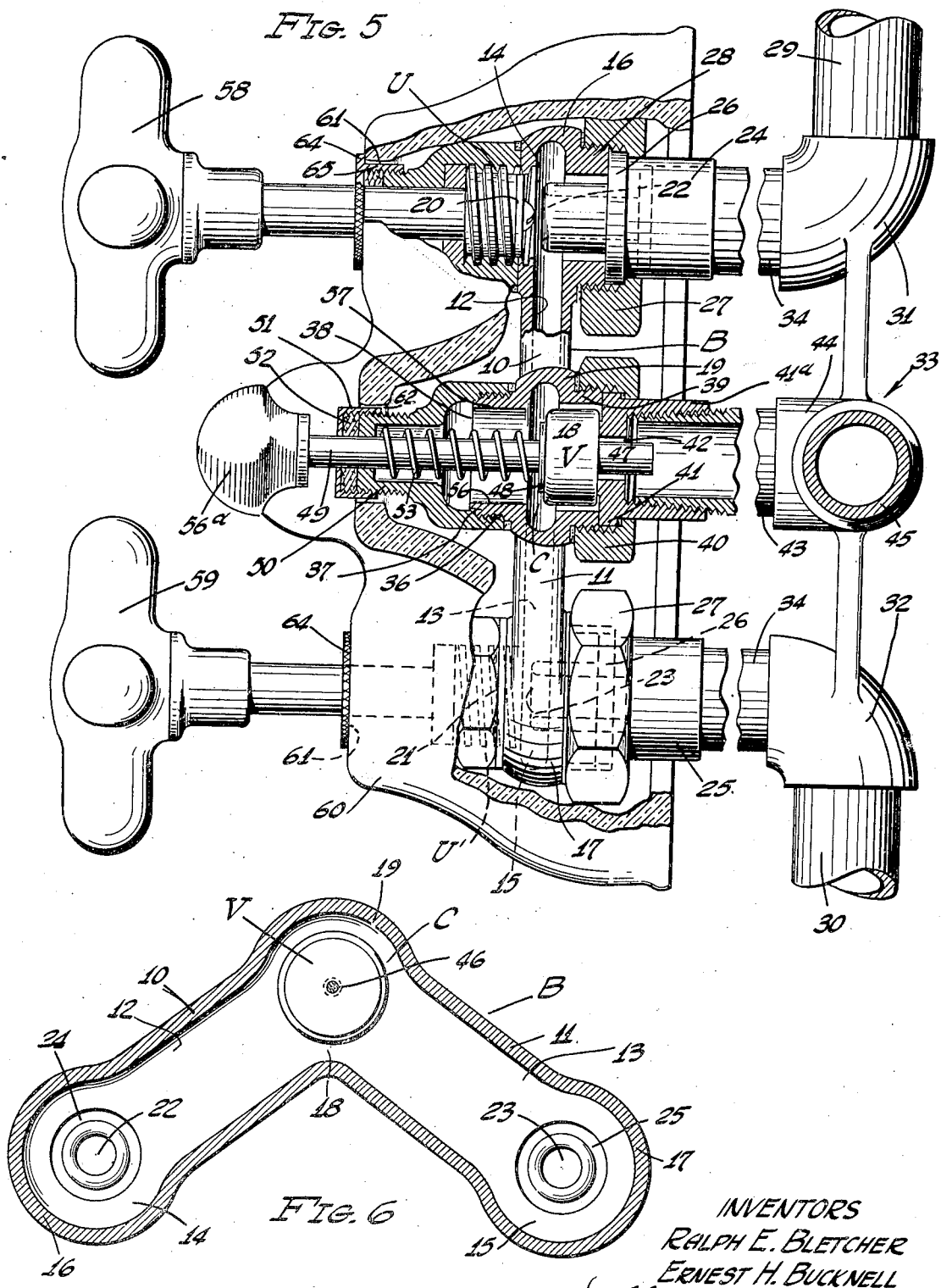

Patented Sept. 20, 1932

1,878,097

UNITED STATES PATENT OFFICE

RALPH E. BLETCHER AND ERNEST H. BUCKNELL, OF LOS ANGELES, CALIFORNIA

COMBINED MIXING AND DIVERTING VALVE

Application filed December 13, 1927. Serial No. 239,758.

Our invention relates to and has for a purpose the provision of an extremely compact mixing and diverting valve which is particularly adapted although not necessarily for use in a bath and shower installation, and by which hot or cold water or any proportioned mixture of the two can be diverted at will to discharge into the bath tub from a suitable spout or to discharge from a suitable shower head.

It is another purpose of our invention to provide a diverting valve which is responsive to the pressure of water in such manner as to positively seal one outlet or another according as the valve occupies one position or another so that leakage of water through one outlet while the water is being diverted to the other will be positively prevented.

It is a further purpose of our invention to provide a mixing and diverting valve which can with ease and dispatch, be connected to or disconnected from the sources of hot and cold water supply and from the shower head, as a unit and from within the room, so that the necessity of breaking into the wall to make the required connections or to replace or repair any part of the valve is entirely obviated.

Still another purpose of our invention is to provide a diverting valve which is normally urged to a position to close the outlet to the shower head so that the water will normally be diverted to the spout for discharge into the bath tub, thus preventing the operator from receiving a wetting by water discharged from the shower head unless the valve is deliberately actuated to open the outlet.

I will describe only one form of combined mixing and diverting valve embodying my invention and will then point out the novel features in claims.

In the accompanying drawings:

Fig. 1 is a vertical sectional view illustrating one form of combined mixing and diverting valve embodying my invention, as applied to a bath and shower installation;

Fig. 2 is a view showing the valve in front elevation;

Fig. 3 is an enlarged vertical sectional view of the valve, taken on the line 3—3 of Fig. 2 and looking in the direction of the arrows, with the diverting valve occupying its normal position in which it diverts water to the spout;

Fig. 4 is a view similar to Fig. 3 with the diverting valve occupying the position in which it diverts water to the shower head;

Fig. 5 is a sectional view taken on the line 5—5 of Fig. 3 and looking in the direction of the arrows, parts beyond the line of section being broken away for the sake of clearness;

Fig. 6 is a sectional view taken on the line 6—6 of Fig. 3 and loooking in the direction of the arrows; and Fig. 7 is a fragmentary view illustrating a fitting by which the valve and shower head are connected to the sources of hot and cold water supply.

Referring specifically to the drawings in which similar reference characters designate similar parts in each of the several views, my invention in its present embodiment comprises a metal body B of inverted V form, the arms 10 and 11 of which are hollow to provide water passages 12 and 13 respectively, communicating at one of their ends with valve chambers 14 and 15 respectively of valve housings 16 and 17 respectively, formed integral with the arms, at their free ends, while the other ends of the passages communicate through a common inlet 18 with a mixing chamber C of a valve housing 19 formed at the junction of the arms.

Valve units U and U' of identical and conventional construction are mounted in the housings 16 and 17 respectively, and include valves 20 and 21 adapted to control inlets 22 and 23 respectively, formed in couplings 24 and 25 respectively, each of the couplings having a flange 26 engaged by a nut 27 having threaded engagement with a reduced externally threaded portion 28 formed at the rear end of each of the housings 16 and 17 so as to detachably secure the couplings to the housings.

In a combination bath and shower installation for which our combined mixing and diverting valve is particularly although not necessarily adapted, pipes 29 and 30 leading respectively from sources of hot and cold water supply, are disposed within a wall W of the bath room, for connection to elbows 31 and 32 respectively, integrally formed in a fitting 33, while the couplings 24 and 25 are connected respectively to the elbows 31 and 32 by means of pipe sections 34 of sufficient length to project through the wall, and into the room, so that the couplings can be threaded onto the pipe sections from within the room.

It will thus be clear that with the body B connected to the couplings 24 and 25 and the latter to the pipe sections 34 as above described, that by suitable adjustment of the valves 20 and 21, hot or cold water or both can be delivered to the mixing chamber C through the inlet 18. A spout 35 adapted to discharge water into a bath tub is threaded internally at 36 for threaded engagement with a reduced externally threaded portion 37 formed on one end of the valve housing 19 so as to communicate with one open end of the chamber C and thereby constitute an outlet 38 from the chamber through which water can be discharged from the latter into the spout. The other end of the housing 19 is reduced and externally threaded at 39 to receive a coupling nut 40 adapted to engage a flange 41 formed on a coupling 41ª, to thereby detachably secure the coupling to the housing and provide in the coupling a second and axially disposed outlet 42 from the chamber C through which water delivered to the latter is adapted to be conveyed to a conventional form of shower head S.

The shower head S is connected to the outlet 42 by means of a pipe 45 disposed at the inner side of the wall W and connected at its upper end to the shower head and at its lower end to an elbow 44 integrally formed in the fitting 33, the elbow being in turn connected to a pipe section 43 projecting through the wall W and into the room a sufficient distance to permit the coupling 41ª to be threaded onto the pipe section from within the room.

To divert water from the mixing chamber C to either the spout 35 or shower head S to the exclusion of the other, a valve V is mounted for reciprocating movement in the mixing chamber. In the present instance the valve V is in the form of a cup shaped body of yieldable or resilient material such as rubber and is provided with a central opening through which projects the reduced threaded end 46 of a stem section 47. The threaded end 46 then projects through a metal washer 48 and is threaded into a second stem section 49 so as to securely clamp the valve between the stem sections. The stem section 49 is mounted in a reduced extension 50 formed on the spout in axial alignment with the chamber C, and a nut 51 having a packing gland 52 is threaded on the extension and constitutes a stuffing box for preventing leakage of water around the stem section 49.

The valve V is normally urged to the extreme position shown in Fig. 3 by means of a coil spring 53 surrounding the stem section 49 and engaging the washer 48, and in such extreme position the valve engages and freely receives therein a tubular extension 54 having a valve seat 55 projecting axially into the end of the chamber C from the coupling 41ª in surrounding relation to the outlet 42.

The valve V is adapted to be manually moved to the extreme position shown in Fig. 4 against the action of the spring 53 by means of knob 56ª secured to the outer end of the stem section 49, and is received within a cylindrically shaped valve seat 56 formed in the inwardly projecting annular portion 57 of the wall of the chamber C between the spout 35 and inlet 18. The stem section 47 is of such diameter as to be received very loosely in the tubular extension 54 and is of such length as to remain in the tubular extension when the valve V is engaging the valve seat 56 so as to maintain the valve in a substantially axial position in the chamber C at all times.

The operation of the combination mixing and diverting valve is as follows:

Assuming that the valves 20 and 21 have been suitably adjusted by rotation of their operating handles 58 and 59 respectively, to deliver hot or cold water or both to the mixing chamber C through its inlet 18, and that the valve V occupies its normally urged position shown in Fig. 3 the water will be diverted to the spout 35, and as a result of the pressure of the water in the chamber C acting upon the exterior surface of the valve V, it will be constricted into sealing engagement with the tubular extension 54 so as to positively seal the outlet 42 against water in the chamber, and thus positively prevent any discharge of water from the shower head S.

However, when it is desired to divert the water to the shower head S to the exclusion of the spout, the knob 56ª is pulled outwardly and the valve V thus disengaged from the tubular extension 54 and moved to its other extreme position shown in Fig. 4 so as to be disposed within the valve seat 56, thus closing the outlet 38 to the spout and opening the outlet 42. With the valve maintained against return movement by the pressure of water thereagainst it will be clear that the water will be diverted to the shower head, and as a result of the pressure of the water in the chamber C acting upon the interior of the valve V at its cupped side, the valve will be expanded into sealing engagement with the valve seat 56, so as to positively seal the outlet 38 against water in the chamber and thus positively prevent any discharge of water from the spout.

It will be manifest that as the valve is normally urged by the spring 53 to the position in which it closes the outlet 42, and hence normally diverts the water to the spout 35, the possibility of the operator receiving an accidental wetting from the shower is eliminated.

The entire valve assembly is adapted to be enclosed by an attractively formed casing 60 of porcelain, china, or other suitable material provided with openings 61 through which the stems of the valves 20 and 21 project, an opening 62 through which the stem section 49 projects, and an opening 63 in alignment with the discharge end of the spout 35. The casing 60 is retained against displacement by flanged collars 64 threaded upon the stuffing box nuts 65 of the valve units U and U'.

It will be manifest that we have provided an extremely compact combined mixing and diverting valve by which hot or cold water or a mixture of the two can be discharged from either a spout of shower head to the exclusion of the other, and that the valve can with ease and dispatch be connected to and removed from the sources of hot and cold water supply and the shower head as a unit from within the room, so that the necessity of disturbing the finish of the wall to make the necessary connections or replace or repair any part of the valve is entirely obviated.

Although I have herein shown and described only one form of combined mixing and diverting valve embodying my invention, it is to be understood that various changes and modifications may be made therein without departing from the spirit of the invention and the spirit and scope of the appended claims.

I claim:

1. A combined mixing and diverting valve comprising a body having a chamber provided between its ends with a pair of inlets adapted for connection to sources of hot and cold water supply, respectively, valves for controlling the inlets, whereby either hot or cold water or a mixture of the two can be delivered to the chamber, a spout projecting from the body and constituting an outlet communicating with one end of the chamber, the chamber having a valve seat between the inlets and spout and being provided at its other end with an axial outlet constructed to provide a tubular extension projecting into the chamber and constituting a second valve seat, and a cup shaped valve in the chamber having a stem projecting from the body by which the valve can be manually reciprocated in the chamber from one extreme position to another to accordingly engage one valve seat or the other and thereby close the respective outlet.

2. A mixing and diverting valve structure including a spout having valved water inlets connected therewith, a shower outlet incorporated in the structure, an external seat, an internal seat, and a reciprocatory valved element movable between the respective seats and adapted when in one position to engage the external seat and thereby close the shower against passage of water thereto from said inlets while permitting water from the inlets to flow from the spout, and adapted when in another position to engage with the internal seat and thereby close the spout against the discharge of water from the inlet while opening the latter to the shower.

3. A mixing and diverting valve structure including a spout having valved water inlets connected therewith, a shower outlet incorporated in the structure, an external seat, an internal seat, and a reciprocatory valve element movable between the respective seats and adapted when in one position to engage the external seat and thereby close the shower against passage of water thereto from said inlets while permitting water from the inlets to flow from the spout, and adapted when in another position to engage with the internal seat and thereby close the spout against the discharge of water from the inlet while opening the latter to the shower, the valve element comprising a body having an annular wall adapted to be expanded against the walls of the internal seat by the action of water pressure.

4. A structure of the class described including respectively independent water outlets, a water inlet common to the respective outlets, a valve seat for each outlet, a valve element common to the respective seats and comprising an expansible body having a skirt adapted to be brought into circumferential contact with either of the seats.

5. A valve structure including relatively independent outlets, an inlet interposed between the respective outlets, an external valve seat for one outlet, an internal valve seat for the other outlet, and a movable valve element between both seats and adapted when in one position to bear against the external seat and adapted when in another position to co-act with the internal seat, the element including an expansible skirt adapted under the effect of water pressure thereagainst to engage with the walls of said internal seat, and yieldable means co-acting with the valve element to force same into sealed engagement with the external seat when water pressure is relieved from against said expansive skirt.

6. A valve structure including relatively independent outlets, an inlet interposed between the respective outlets, an external valve seat for one outlet, an internal valve seat for the other outlet, and a movable valve element between both seats and adapted when in one position to bear against the external seat and adapted when in another position to co-act with the internal seat, the element including an expansible skirt adapted under the effect of water pressure thereagainst to engage with the walls of said internal seat, and yieldable means co-acting with the valve element to force same into sealed engagement with the external seat when water pressure is relieved from against said expansive skirt, said means including a manually controlled stem carried by the valve element and having a manipulating portion exteriorly exposed from the structure.

7. A bath fitting comprising an escutcheon provided with a vertical apertured face adapted to be placed flatwise against a wall with its aperture positioned to have projected thereinto one end of a water outlet pipe and the discharge ends of respective water inlet pipes, the escutcheon having an orifice, and a structure contained within the escutcheon and having relatively separate devices connected with the respective pipes, a valve for each of said devices, each valve having a manipulating portion exposed exteriorly of the escutcheon, and means in association with one of the valves for permitting water from the inlet pipes to be discharged from the orifice of the escutcheon when the valve is in one adjusted position and for permitting water from said inlets to be conducted to the said outlet pipe when the valve is in another position.

8. A bath fitting comprising an escutcheon provided with a flat apertured face adapted to be applied against a wall surface to permit of the passage therein of the projecting ends of a concealed water supply pipe and a concealed water discharge pipe, valve means concealed within said escutcheon for controlling the supply of water from the inlet pipe to the discharge pipe, and exteriorly projecting means without said escutcheon for operating said valve means.

9. A valve structure for use in connection with concealed water intake and discharge pipes, respectively, of the type employing portions adapted to project through and from one side of a vertical wall in which the pipes are concealed, comprising a valved connection adapted to be positioned wholly against one side of a wall surface in juxtaposition to the projecting portions of the concealed pipes and having connection therewith whereby to permit water from the intake to be conducted to the discharge pipe and through said connection, and the said connection including valve mechanism for controlling the delivery of water from the intake to the discharge pipe.

10. In a bath fitting for use in connection with concealed water inlet and discharge pipes, respectively, the combination with a body having communicating water passages, valve means for controlling the admission of water to said passages from hot and cold water connections, respectively, valve means associated with both of said passages for controlling the discharge of water from one or the other of said passages, an escutcheon wholly accommodating said body therewithin and having an open vertical side adapted to be placed flatwise against a wall surface and an opening at its bottom portion for the reception of said spout, and means co-acting with the first said valve means for confining the escutcheon on said body.

11. A valve structure for use in connection with concealed water intake and discharge pipes, respectively, of the type employing portions adapted to project through and from one side of a vertical wall in which the pipes are concealed, comprising a valved connection adapted to be positioned wholly against one side of a wall surface in juxtaposition to the projecting portions of the concealed pipes and having connection therewith whereby to permit water from the intake to be conducted to the discharge pipe and through said connection, the said connection including valve mechanism for controlling the delivery of water from the intake to the discharge pipe, an escutcheon concealing the connection and the valve mechanism and adjustable horizontally so that one side thereof may be brought against a surface of the wall through which said pipe portions project, and means for securing the escutcheon in a position of fixed adjustment.

12. A bath fitting comprising an escutcheon formed with an apertured face adapted to be applied flatwise against a wall surface with its aperture positioned to have projected therethrough one end of a water outlet pipe and the discharge ends of respective inlet pipes, and valved means within the escutcheon for controlling the flow of water from the inlet pipes to the outlet pipe and provided with a manipulating portion exposed exteriorly of the escutcheon.

RALPH E. BLETCHER.
ERNEST H. BUCKNELL.